United States Patent [19]

Ashfield et al.

[11] 4,084,641
[45] Apr. 18, 1978

[54] CONTROL FOR A TRACTOR POWER LIFT MECHANISM

[75] Inventors: Herbert Edward Ashfield; Harry Horsfall, both of Huddersfield, England

[73] Assignee: David Brown Tractors Limited, Huddersfield, England

[21] Appl. No.: 656,196

[22] Filed: Feb. 9, 1976

[51] Int. Cl.² .......................................... A01B 63/112
[52] U.S. Cl. ..................................................... 172/9
[58] Field of Search .......................... 172/7, 9, 10, 11

[56] References Cited

U.S. PATENT DOCUMENTS

| | | | |
|---|---|---|---|
| 2,864,295 | 12/1958 | Du Shane | 172/9 |
| 2,921,638 | 1/1960 | Du Shane | 172/9 |
| 3,315,751 | 4/1967 | Hull et al. | 172/9 |
| 3,422,906 | 1/1969 | Bunting et al. | 172/9 |
| 3,456,736 | 7/1969 | Hull et al. | 172/9 |
| 3,674,095 | 7/1972 | Roger | 172/7 |
| 3,917,002 | 11/1975 | Mueller, Jr. | 172/9 |

*Primary Examiner*—Richard T. Stouffer
*Attorney, Agent, or Firm*—Norris & Bateman

[57] ABSTRACT

Adjustable mixed automatic height and draft control apparatus for a tractor power lift mechanism includes a height control rocker actuated by the tractor's rockshaft, a draft control rocker actuated by the tractor's hitch linkage, and a first balance lever moveable relative to either one of the rockers by movement of the other. A control linkage has its point of connection to the first balance lever variable by a first hand lever to adjust the mixture of height and draft control, a second hand lever gives over-riding manual control of the power lift mechanism, and a second balance lever is moveable relative to either one of the control linkage and the other hand lever by movement of the second. The second balance lever actuates the control valve of the power lift mechanism.

11 Claims, 3 Drawing Figures

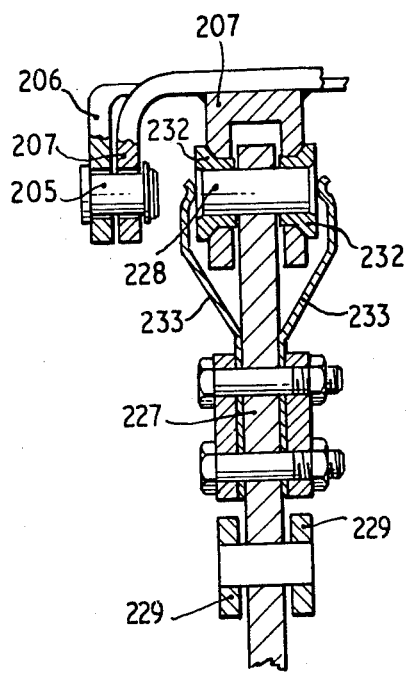
-FIG.3-

CONTROL FOR A TRACTOR POWER LIFT MECHANISM

BACKGROUND OF THE INVENTION

The invention relates to control means for a tractor power lift mechanism, and has for its object to provide adjustable mixed height and draft control means. Height control enables an implement hitched to the tractor to be automatically maintained at a predetermined height relative to the tractor by the feed-back to the power lift mechanism of signals proportional to variations in said height. Draft control enables the working depth of the implement in the soil to be automatically varied by the feed-back to the power lift mechanism of signals proportional to variations in the draft force exerted by the tractor on the implement, in order to maintain said force at a predetermined value. Adjustable mixed height and draft control enables the two modes of control to function simultaneously with adjustable proportional effect, the height control mode moderating the effect of the draft control mode on the power lift mechanism with the result that the magnitude of the response to said mechanism to feed-back signals proportional to variations in the draft force is reduced.

SUMMARY OF INVENTION

According to the invention, control means for a tractor power lift mechanism comprise an arm moveable automatically by variations in the height relative to the tractor of an implement hitched thereto, an arm moveable automatically by variations in the draft force exerted by the tractor on the implement, one balance lever moveable relative to either one of said automatically moveable arms by movement of the other, a control linkage connected to said one balance lever, one hand lever connected to said linkage for varying its point of connection to said one balance lever, another hand lever, another balance lever moveable relative to either one of the control linkage and said other hand lever by movement of the other, and a control valve actuated by said other balance lever.

BRIEF DESCRIPTION OF DRAWINGS

One embodiment of the invention will now be described, by way of example, with reference to the accompanying drawings of which:

FIG. 3 is a section on the line 3—3 in FIG. 2.

DESCRIPTION OF PREFERRED EMBODIMENT

Figure 1:
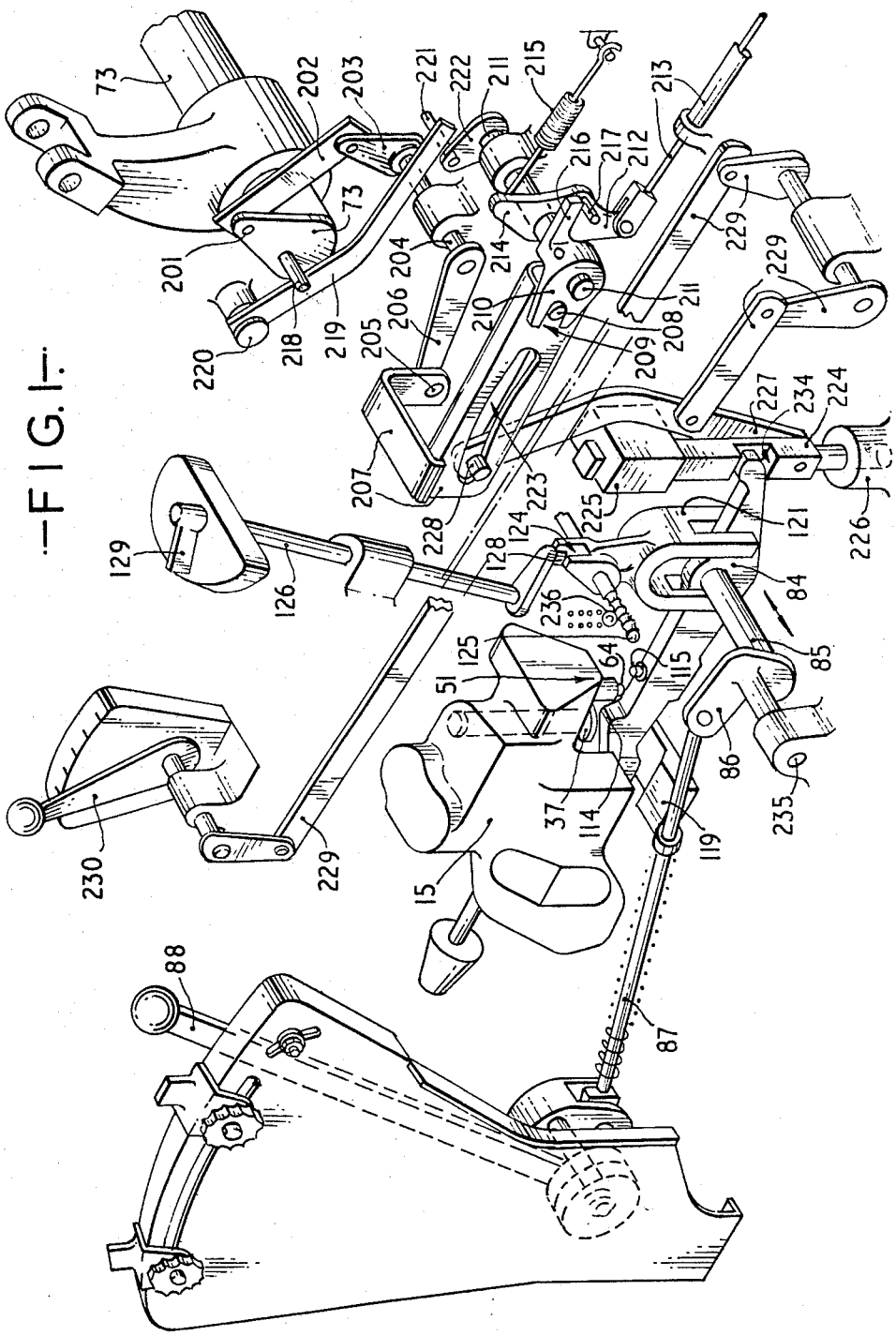
FIG. 1 is a diagrammatic perspective view of a tractor power fit mechanism.
Figure 2:
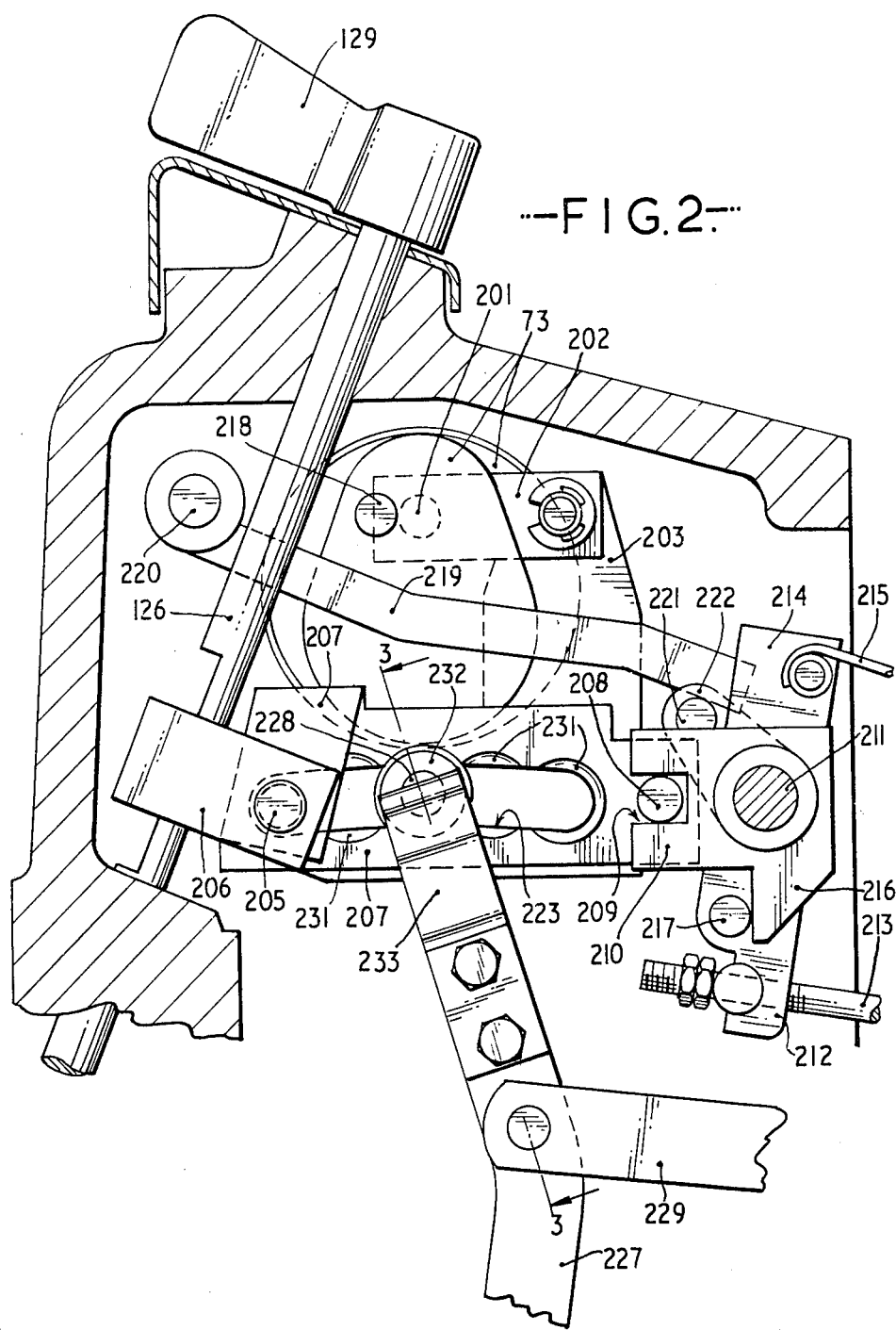
FIG. 2 is a semi-diagrammatic side elevation of a detail thereof.

Referring now to the drawings, the tractor hydraulic power lift mechanism described and illustrated in U.S. Pat. No. 3,315,751, with the minor modifications described and illustrated in U.S. Pat. No. 3,456,736, is provided with adjustable mixed height and draft control means. Said means comprise one pin 201 secured eccentrically on the tractor's rockshaft 73 and pivotally connected to one end of a rod 202 the other end of which is pivotally connected to one arm 203 of one bell-crank lever having a fixed fulcrum 204. Pivotally connected at 205 to the other arm 206 (which functions as a height control rocker) of said lever is one end of one balance lever 207. The other end of the balance lever 207 carries a pin 208 which engages a radial slot 209 in one arm 210 (which functions as a draft control rocker) secured on a spindle 211. One arm 212 of a two-armed lever which is rotatably mounted on said spindle is connected by a Bowden cable 213 to the tractor's draft sensing device, and the other arm 214 of said lever is connected to a helical tension spring 215 arranged to bias said lever in a direction to put the cable 213 in tension. A lost motion connection between the spindle 211 and said two-armed lever comprises an abutment 216 integral with the arm 210 and a pin 217 on said lever. Another pin 218 secured eccentrically on the rockshaft 73 can contact a lever 219 having a fixed fulcrum 220. The lever 219 contacts a pin 221 on another arm 222 secured on the spindle 211. The balance lever 207 has an arcuate slot 223 extending from the vicinity of the pin 208 to a point co-axial with the point of pivotal connection 205 of said lever to the arm 206 of said one bell-crank lever. A control linkage comprises a control member 224 slideable axially in guides 225 and 226, and a line 227 pivotally connected at one end to the control member 224 and having at its other end a pin 228 which engages in the arcuate slot 223 in the balance lever 207. The line 227 is pivotally connected between its ends to one end of a linkage 229 the other end of which is connected to one hand lever 230. As shown in FIGS. 2 and 3, the balance lever 207 has a plurality of detents comprising axially aligned pairs of dimples 231 spaced along both sides of the slot 223 therein, that is to say formed in the faces of said lever and not in the edges of said slot, and the pin 228 at said other end of the link 227 carries spring-loaded means for selectively engaging said detents comprising a longitudinally split bobbin 232 freely mounted on the pin 228, the two halves of said bobbin being urged towards each other by respective leaf springs 233 secured to the link 227 so as to disengageably grip any one pair of the dimples 231. The control member 224 has a slot 234 engageable by one end of another balance lever 84, and said lever is freely mounted on a shaft 85 carried by one arm of another bell-crank lever 86 having a fixed fulcrum 235. A rod 87 is pivotally connected at one end to the other arm of the lever 86, and at its other end to another hand lever 88. The balance lever 84 is provided, near that one of its ends remote from the control member 224, with a projection 114 which contacts a control valve in the form of a slide valve 37 housed in a valve block 15 and urged by a helical compression spring (not shown) into contact with said lever. The balance lever 84 is displaceable laterally along the shaft 85 by means of a fork 121 secured on an axially slideable shaft 125 having two detents engageable alternatively by a spring-loaded ball 236. A slot 124 in the fork 121 is engaged by a crank-pin 128 disposed at one end of a shaft 126 which has a further hand lever 129 secured to its other end. Appropriate movement of the hand lever 129 displaces the balance lever 84 laterally out of engagement with the slot 234 in the control member 224, and brings that end of the last-mentioned lever remote from said member into contact with a fixed abutment surface 119, and a projection 115 on said lever between the slide valve 37 and the shaft 85 into operative alignment with a member 64 of a variable-pressure relief valve 51 housed in the valve block 15, whilst maintaining contact between said lever and the slide valve 37. The construction and operation of the valve block 15, including the slide valve 37 and the variable-pressure relief valve 51 hereinbefore referred to, are as described and illustrated in U.S. Pat. No. 3,315,751 with the minor modifications described and illustrated in U.S. Pat. No. 3,456,736.

The operation of the control means is as follows:

When the balance lever 84 is engaged with the control member 224, the desired mixture of automatic height control and automatic draft control is set by appropriate positioning of the hand lever 230. When said lever is positioned so that the pin 228 which engages in the arcuate slot 223 in the balance lever 207 is co-axial with the point of pivotal connection 205 between the last-mentioned lever and the arm 206 of said one bell-crank lever, an implement hitched to the tractor is subjected solely to automatic height control. When the hand lever 230 is positioned so that the pin 288 is disposed at the opposite end of the slot 223, the implement is subjected to a preponderance of automatic draft control but is still subjected to a limited extent to automatic height control. If height and draft control are required to be mixed in, say, roughly equal proportions in order to reduce the tendency for over-correction or hysteresis to occur in the hydraulic power lift mechanism when, for example, a semi-trailed plough hitched to the tractor solely by a pair of laterally-spaced links is in work, the hand lever 230 is positioned so that the pin 228 is disposed as nearly as possible mid-way between the pin 208 which engages in the radial slot 209 in the arm 210 and the point of pivotal connection 205 of the balance lever 207 to the arm 206 of said one bell-crank lever. In all positions of the pin 228 in the slot 223, including its two extreme positions, the bobbin 232 mounted on said pin grips one of the pairs of dimples 231 associated with said slot.

When the hand lever 230 has been positioned as described in the preceding paragraph, the implement can be moved at the will of the driver between its fully raised and fully lowered positions by appropriate movement of the hand lever 88. As the implement approaches its fully raised position, the pin 218 on the rockshaft 73 contacts the lever 219 and moves it about its fulcrum 220 so that said lever acts through the pin 221, the arm 222 and the spindle 211 to force the arm 210 in an anti-clockwise direction as seen in FIG. 2 into its minimum draft force position against the action of the spring associated with the slide valve 37. This is permitted by the lost motion connection comprising the pin 217 and the abutment 216, which are normally held in contact with one another by the action of the last-mentioned spring but which are now held temporarily out of mutual contact so that the arm 210 is immobilised. The pin 217 and the abutment 216 are allowed to move back into contact with one another as the implement commences to be lowered. The purpose of rendering the arm 210 immobile when the implement is fully raised is to avoid the automatic feed-back of undesirable signals, that is to say to avoid undesirable movement of the balance lever 207, and thus of the slide valve 37, due to movement of said two-armed lever caused by bouncing of the implement affecting the tractor's draft sensing device when traversing rough ground.

With automatic height control, any variation in the height of the implement relative to the tractor, due for example to leakage from the tractor's lift cylinder, involves angular movement of the rockshaft 73 and consequential movement of said one bell-crank lever. This pivots the balance lever 207 about the pin 208 which engages in the radial slot 209 in the arm 210, and the resulting movement of the control linkage pivots the balance lever 84 about the shaft 85. The balance lever 84 thus actuates the slide valve 37 to cause the supply or release of oil to or from the lift cylinder to restore the implement to the required height. As this restoring action proceeds, the rockshaft 73, said one bell-crank lever, the balance lever 207, the control linkage and the balance lever 84 move back to their original positions and the slide valve 37 is therefore permitted to lock oil in the lift cylinder as the required height is reached.

With mixed automatic height and draft control, any variation in the draft force exerted by the tractor on the implement, due for example to a change in the consistency of the soil, involves operation of the Bowden cable 213 and consequential movement of the arm 210. This pivots the balance lever 207 about its point of pivotal connection 205 to the arm 206 of said one bell-crank lever, whereupon the control means operate as described in the preceding paragraph but with a moderated effect due to the pin 228 which engages in the arcuate slot 223 in the balance lever 207 moving through a predeterminedly smaller distance than the pin 208 which engages in the radial slot 209 in the arm 210. The balance lever 84 thus actuates the slide valve 37 to cause the supply or release of oil to or from the lift cylinder to restore the draft force to the required value by descreasing or increasing the working depth of the implement. As this restoring action proceeds, the arm 210 is moved back towards its original position and the arm 206 of said one bell-crank lever is simultaneously moved by the rockshaft 73. Both of said arms act together upon the respective ends of the balance lever 207 in such a way that the slide valve 37 is permitted to lock oil in the lift cylinder as the required draft force is reached. Adjustment of the proportional effect of the height and draft control modes by means of the hand lever 230 enables the magnitude of response of the hydraulic power lift mechanism to be varied so as to reduce the tendency of said mechanism to over-correct when variations in the draft force occur whilst certain implements are in use.

When the hand lever 129 is operated to displace the balance lever 84 clear of the control member 224 into contact with the fixed abutment surface 119 and into operative alignment with the member 64 of the relief valve 51, part of the weight of the implement can be transferred to the tractor in order to augment the tractive effort, and the hydraulic power lift mechanism is entirely under manual control and not subjected to any automatic control by the feed-back of signals. The amount of weight transferred is controlled by appropriate movement of the hand lever 88 within an arc at the "lower" end of its range of travel, and the hand lever 230 is inoperative. The setting of the hand lever 88 determines the pressure value at which the relief valve 51 opens, and the maintenance of this pressure value in the tractor's lift cylinder exerts upon the implement a force less than that required to raise it from its working depth. The amount of weight transferred is proportional to said force.

In a modification, the arm 210 carries the pin 217 and is secured together with the arm 222 carrying the pin 221 on a sleeve which is rotatably mounted on the spindle 211, whilst said two-armed lever and the abutment 216, which is separate from the arm 210, are secured on said spindle. This arrangement temporarily immobilises the arm 210 when the implement is fully raised in exactly the same manner as the arrangement shown in the drawings, of which it is merely a mechanical inversion.

In another modification, the control means are disposed at the opposite end of the rockshaft 73 to that shown in the drawings.

We claim:

1. Control means for a tractor power lift mechanism comprising a movably mounted first member, height control means for automatically moving said first member in response to variations in the height relative to the tractor of an implement hitched to said tractor, a movably mounted second member, draft control means for automatically moving said second member in response to variations in the draft force exerted by the tractor on the implement, means including a movably mounted first balance lever interconnecting said first and second members, a first manually operable lever, a control linkage connected between said first balance lever and said first manually operable lever and comprising means for varying the point of connection of said control linkage to said lever whereby to vary the proportions of height and draft control, control valve means for said power lift mechanism, a second movably mounted balance lever adjustably connected to said first balance lever by said control linkage and also operatively interconnected between said control linkage and said valve means for actuating said valve means, and a second manually operable lever operatively connected to actuate said second balance lever to operate said valve means.

2. Control means according to claim 1, wherein said one balance lever has a slot with a plurality of detents engageable selectively by spring-loaded means on the control linkage to enable the proportion of height and draft control to be adjusted by fixed increments.

3. Control means according to claim 1, wherein means are provided for temporarily immobilising the second member that is moveable automatically by variations in the draft force, when the implement is fully raised.

4. Control means according to claim 1, wherein a fixed abutment and a relief valve for said power lift mechanism are provided and means including a further manually operable lever is connected to said second balance lever for moving said second balance lever out of operative connection with said control linkage, into contact with said fixed abutment and into alignment with an operator for said relief valve, while maintaining operative association of said second balance lever with said control valve and said second manually operable lever.

5. Control means according to claim 1, wherein said control linkage comprises a reciprocable control member adapted to be operably connected to said second balance lever, a link operably interconnects said first balance lever and said reciprocable control member, and said first manually operable lever is operably connected to said link.

6. Control means for a tractor power lift mechanism comprising a movably mounted first member, height control means for automatically moving said first member in response to variations in the height relative to the tractor of an implement hitched to said tractor, a movably mounted second member, draft control means for automatically moving said second member in response to variations in the draft force exerted by the tractor on the implement, means including a movably mounted first balance lever interconnecting said first and second members, a first manually operable lever, a control linkage connected between said first balance lever and said first manually operable lever and comprising means for varying the point of connection of said control linkage to said lever whereby to vary the proportions of height and draft control, control valve means for said power lift mechanism, a second movably mounted balance lever operatively interconnected between said control linkage and said valve means for actuating said valve means, and a second manually operable lever operatively connected to actuate said second balance lever to operate said valve means, said control linkage comprising a reciprocable control member adapted to be operably connected to said second balance lever, a link operably interconnecting said first balance lever and said reciprocable control member, and said first manually operable lever being operably connected to said link, and wherein said first balance lever has a slot with a plurality of spaced detents engageable selectively by spring-loaded means on the control linkage to enable the proportions of height and draft control to be adjusted by fixed increments, said detents comprising axially aligned pairs of dimples spaced along both sides of the slot, and said spring-loaded means comprises a longitudinally split bobbin on said link, the two halves of the bobbin being resiliently urged together so as to disengageably grip one pair of the dimples.

7. Control means according to claim 6, wherein the two halves of the bobbin are urged together by respective leaf springs.

8. Control means for a tractor power lift mechanism comprising a movably mounted first member, height control means for automatically moving said first member in response to variations in the height relative to the tractor of an implement hitched to said tractor, a movably mounted second member, draft control means for automatically moving said second member in response to variations in the draft force exerted by the tractor on the implement, means including a movably mounted first balance lever interconnecting said first and second members, a first manually operable lever, a control linkage connected between said first balance lever and said first manually operable lever and comprising means for varying the point of connection of said control linkage to said lever whereby to vary the proportions of height and draft control, control valve means for said power lift mechanism, a second movably mounted balance lever operatively interconnected between said control linkage and said valve means for actuating said valve means, a second manually operable lever operatively connected to actuate said second balance lever to operate said valve means, and means for temporarily immobilising the second member that is movable automatically by variations in the draft force, when the implement is fully raised, said means for temporarily immobilising said second member that is movable automatically in response to variations in draft force comprising a lever connected to draft sensing means adapted to move said second member into its minimum draft force position, and a lost motion connection between said lever and said second member.

9. Control means for a tractor power lift mechanism comprising a movably mounted first member, height control means for automatically moving said first member in response to variations in the height relative to the tractor of an implement hitched to said tractor, a movably mounted second member, draft control means for automatically moving said second member in response to variations in the draft force exerted by the tractor on the implement, means including a movably mounted first balance lever interconnecting said first and second members, a first manually operable lever, a control linkage connected between said first balance lever and said first manually operable lever and comprising means for varying the point of connection of said control linkage to said lever whereby to vary the proportions of height and draft control, control valve means for said power lift mechanism, a second movably mounted balance lever operatively interconnected between said control linkage and said valve means for actuating said valve means, and a second manually operable lever operatively connected to actuate said second balance lever to operate said valve means, said first and second movable members being pivoted arms, and said first balance lever being pivotally connected at spaced points to said arms.

10. Control means according to claim 9, wherein said control linkage comprises a link having one end adjustable to various positions along a slot in said first balance lever for varying the proportions of height and draft control.

11. Control means according to claim 10, wherein said control linkage comprises a reciprocable member pivotally connected to the other end of said link, and having a detachable connection to an end of said second balance lever.

* * * * *

UNITED STATES PATENT OFFICE
CERTIFICATE OF CORRECTION

Patent No. 4,084,641  Dated April 18, 1978

Inventor(s) Herbert Edward Ashfield et al.

It is certified that error appears in the above-identified patent and that said Letters Patent are hereby corrected as shown below:

Column 5, line 19, after "said" insert -- first balance --.

Column 6, line 3, after "said" insert -- first balance --.

Column 6, line 43, after "said" insert -- first balance --.

Column 7, line 6, after "said" insert -- first balance --.

Signed and Sealed this

Nineteenth Day of December 1978

[SEAL]

*Attest:*

RUTH C. MASON
*Attesting Officer*

DONALD W. BANNER
*Commissioner of Patents and Trademarks*